(12) United States Patent
Andersson et al.

(10) Patent No.: US 8,687,711 B2
(45) Date of Patent: Apr. 1, 2014

(54) ENCODING FILTER COEFFICIENTS

(75) Inventors: Kenneth Andersson, Gavle (SE); Per Frojdh, Stockholm (SE); Clinton Priddle, Upplands Vasby (SE); Jonatan Samuelsson, Skarpnack (SE); Rickard Sjoberg, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 711 days.

(21) Appl. No.: 12/811,996

(22) PCT Filed: Jan. 8, 2009

(86) PCT No.: PCT/EP2009/000065
§ 371 (c)(1),
(2), (4) Date: Jul. 7, 2010

(87) PCT Pub. No.: WO2009/087095
PCT Pub. Date: Jul. 16, 2009

(65) Prior Publication Data
US 2010/0284461 A1    Nov. 11, 2010

Related U.S. Application Data

(60) Provisional application No. 61/019,727, filed on Jan. 8, 2008, provisional application No. 61/123,769, filed on Apr. 11, 2008.

(51) Int. Cl.
- *H04B 1/66* (2006.01)
- *H04N 7/12* (2006.01)
- *H04N 11/02* (2006.01)
- *H04N 11/04* (2006.01)

(52) U.S. Cl.
USPC ............ 375/240.29; 375/240.02; 375/240.1; 375/240.12

(58) Field of Classification Search
None
See application file for complete search history.

(56) References Cited

U.S. PATENT DOCUMENTS

| | | | |
|---|---|---|---|
| 7,379,501 B2 * | 5/2008 | Lainema | 375/240.29 |
| 2004/0161035 A1 * | 8/2004 | Wedi | 375/240.12 |
| 2005/0105617 A1 * | 5/2005 | Chono | 375/240.16 |

FOREIGN PATENT DOCUMENTS

| | | |
|---|---|---|
| WO | 03/058945 A2 | 7/2003 |
| WO | 2006/108654 A2 | 10/2006 |

OTHER PUBLICATIONS

Sohn, Y. et al. "One Dimensional Transform for H.264 based Intra Coding." Picture Coding Symposium, Lisbon, Nov. 7, 1997.

(Continued)

*Primary Examiner* — Joseph Ustaris
*Assistant Examiner* — Edemio Navas, Jr.
(74) *Attorney, Agent, or Firm* — Coats and Bennett, P.L.L.C.

(57) ABSTRACT

A method of encoding a plurality of adaptive filter coefficients (104, 107, 112) into a bitstream (110). The method comprises the steps of entropy encoding (109) the adaptive filter coefficients (104, 107, 112) into the bitstream (110), whereby a prediction (202) for an instance (204) of the adaptive filter coefficients is determined (201) based on at least one of the remaining adaptive filter coefficients (206), a prediction error (205) is determined (203) based on the difference between the instance (204) of the adaptive filter coefficients and the prediction (202), and wherein the step of entropy encoding (109) the plurality of adaptive filter coefficients (104, 107, 112) comprises entropy encoding (109) the prediction error (205) for the instance (204) of the adaptive filter coefficients and entropy encoding (109) the remaining adaptive filter coefficients (206). Further is provided a corresponding method of decoding a bitstream (110) of encoded adaptive filter coefficients into decoded adaptive filter coefficients (116, 118, 120, 123).

15 Claims, 4 Drawing Sheets

(56) References Cited

OTHER PUBLICATIONS

Vatis, Y. et al. "Syntax of Adaptive Filter Coefficients in the KTA Reference Model." ITU—Telecommunications Standardization Sector, Study Group 16 Question 6, Document VCED-AF09, Filename: VCEG-AF09.zip, Video Coding Experts Group (VCEG), 32nd Meeting: San Jose, CA, Apr. 20-21, 2007.

* cited by examiner

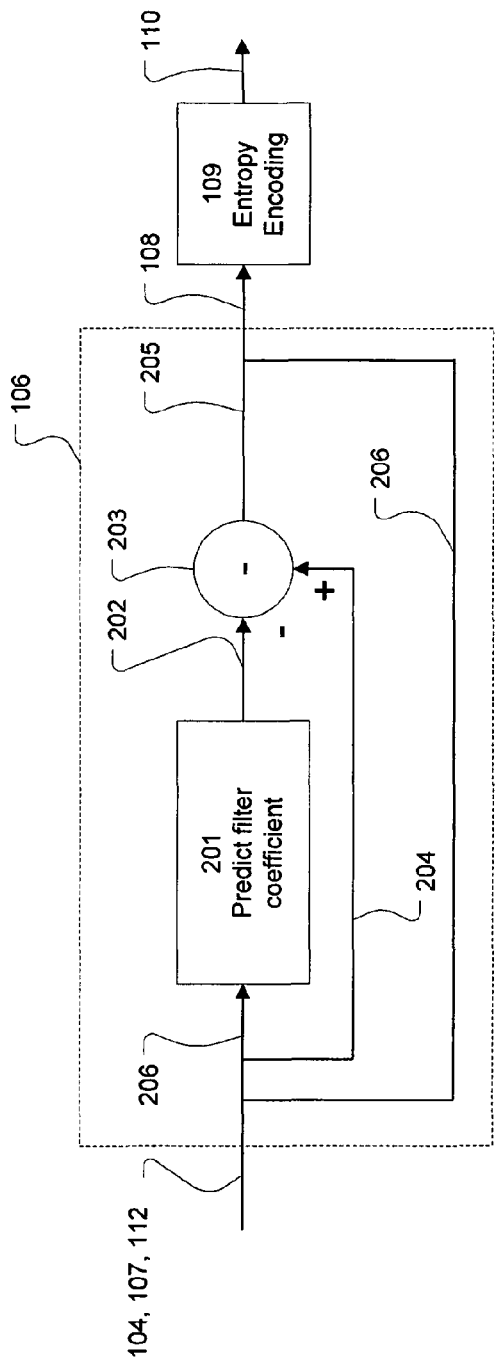
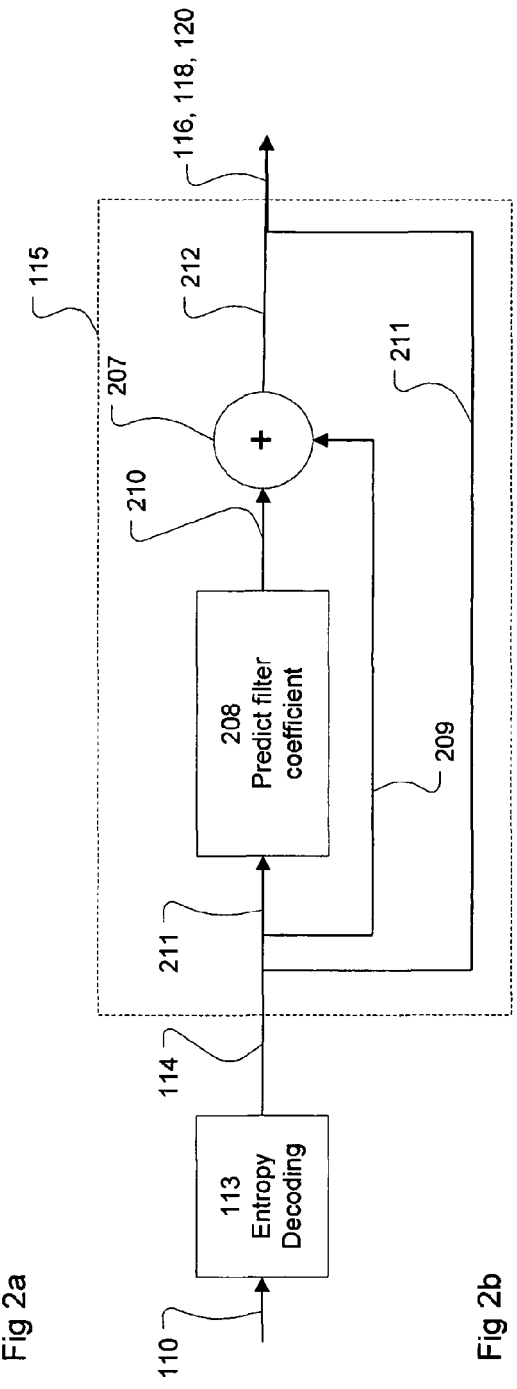
Fig 2a
Fig 2b

ENCODING FILTER COEFFICIENTS

TECHNICAL FIELD

The present invention generally relates to adaptive intra frame and inter frame prediction in video encoding and decoding. The invention more specifically relates to encoding adaptive filter coefficients of adaptive filters in intra frame and inter frame prediction.

BACKGROUND

Temporal redundancy can be exploited using prediction of pixel values in the current frame by using a previous frame. Pixel prediction is an important part of video coding standards such as H.261, H.263, MPEG-4 and H.264 [1]. In H.264 there are two pixel prediction methods utilized namely intra and inter frame prediction. Intra frame prediction gives a spatial prediction of a block in frame currently being encoded using previously reconstructed pixels from the same frame. Inter frame prediction gives a temporal prediction of the current block using a corresponding but displaced block in a previously reconstructed frame, e.g. reference block. Inter frame prediction can also use a weighted average of two inter frame predictions. The prediction error compared to an original is then transform coded and quantised. A reconstructed frame can then be generated by adding the predictions and the coded prediction errors. A loop filter is then applied to reduce coding artefacts before storing the frame in a reference frame buffer for later use by Inter frame prediction.

In order to increase the coding efficiency of current video coding standards adaptive filters for inter frame prediction [2] or loop- or post filtering [6] have been proposed. In Inter frame prediction typically several sub-pel motion specific adaptive filters are used for each frame. If many adaptive filter coefficients are used per frame there will be a substantial overhead for the representation of adaptive filter coefficients. Typically reference adaptive filter coefficients corresponding to a Wiener filter are subtracted from the adaptive filter coefficients to achieve small difference filter coefficients [2]. Then the difference filter coefficients are quantised. Prediction between quantised difference filter coefficients from a nearby sub-pel position is exploited in some cases [4]. Prediction in the context of adaptive filter coefficients may be interpreted as estimation of adaptive filter coefficients. Filter symmetry may be exploited for the prediction of adaptive filter coefficients [3,4,5].

Since the adaptive filter coefficients are determined in the encoder and provided to the decoder they add on the overhead of the total bit rate. The relative overhead of the adaptive filter coefficients to the total bit rate depends on the actual bit rate used. For low resolution video the overhead can be very high, more than 10%.

SUMMARY

It is therefore an object of the invention to reduce coding overhead caused by adaptive filter coefficients.

The object is achieved in a method of encoding a plurality of adaptive filter coefficients into a bitstream according to claim 1. The method comprises the steps of entropy encoding the adaptive filter coefficients into the bitstream, determining a prediction for an instance of the adaptive filter coefficients based on at least one of the remaining adaptive filter coefficients, determining a prediction error based on the difference between the instance of the adaptive filter coefficients and the prediction. The step of entropy encoding the plurality of adaptive filter coefficients comprises entropy encoding the prediction error for the instance of the adaptive filter coefficients and entropy encoding the remaining adaptive filter coefficients.

The value of one coefficient can be predicted or estimated using values of other coefficients of the same filter. An especially good assumption to be used for the prediction is that the un-quantised adaptive filter coefficients typically should sum to one, e.g. no amplification of the average pixel values. In other words DC level is kept. The DC-gain of the filter equals the sum of the filter coefficients as is described in reference [7]. This is usually the case intra frame and inter frame prediction according to H.264 [1]. In this case the average of the pixel values of an object is the same in successive video frames. Also in certain adaptive filters, internal symmetry of adaptive filter coefficients using matrix notation can be used.

In an embodiment of the invention, the method applies to difference filter coefficients, whereby the method further comprises a step of determining the difference filter coefficients by subtracting reference adaptive filter coefficients from corresponding adaptive filter coefficients. Reference adaptive filter coefficients relate to H.264 or any other filter used according to a standard or defined in a video coding bitstream, where the adaptive filter coefficients correspond to a similar filter as the reference filter having adaptive filter coefficients in common, which was modified to have adaptive characteristics.

In an embodiment of the invention, the step of determining a prediction for an instance of the adaptive filter coefficients comprises determining a sum of the remaining adaptive filter coefficients, determining the prediction by subtracting the sum from a constant. The constant is equal to the DC-gain of the adaptive filter and the DC-gain is equal to the sum of all adaptive filter coefficients. In the case of difference filter coefficients the constant is equal to zero.

Especially the fact that the sum of the adaptive filter coefficients typically equals to one is used to predict one or several adaptive filter coefficients.

In an embodiment of the invention, the adaptive filter coefficients are arranged in a matrix of adaptive filter coefficients having at least one symmetry axis, and the step of determining at least one prediction of at least one adaptive filter coefficient comprises a step of predicting an adaptive filter coefficient by mirroring a corresponding adaptive filter coefficient around said at least one symmetry axis of said matrix.

By exploiting the correlation between adaptive filter coefficients, the overhead for deploying adaptive filters in video or image coding is reduced. Mirroring of adaptive filter coefficients is a practical tool for predicting adaptive filter coefficients, for filters having symmetry over a vertical or horizontal axis in the corresponding filter matrix having the adaptive filter coefficients.

In another embodiment of the invention, the adaptive filter coefficients are arranged in a matrix. The step of determining a prediction for an instance of the adaptive filter coefficients comprises subdividing the matrix of adaptive filter coefficients into a plurality of sub-matrices, each having a subset of adaptive filter coefficients, for each of the sub-matrices predicting the adaptive filter coefficients in the sub-matrix using the adaptive filter coefficients not in the sub-matrix, applying a cost function to each of the sub-matrices having the predicted adaptive filter coefficients and its associated adaptive filter coefficients not in the sub-matrix, selecting the sub-matrix with the lowest cost as the sub-matrix to be encoded, and encoding an index of the selected sub-matrix.

Subdividing the matrix into sub-matrixes allows for optimal selection of related adaptive filter coefficients which can be predicted together. By making predefined sub-matrices, an optimal selection of a sub-matrix may be made yielding the least cost in bits to be encoded.

A sub-matrix may according to a further embodiment of the invention be composed by selecting centre adaptive filter coefficients from the filter matrix, the centre adaptive filter coefficients having the largest values. By predicting the largest values the highest savings in terms of bits to be encoded is achieved.

A step of quantizing the adaptive filter coefficients prior to the step of determining at least one prediction of at least one adaptive filter coefficient may be part of the process of encoding the adaptive filter coefficients.

The invention can be used for representation of adaptive filters in both inter and intra frame coding. In inter frame coding it can be for used for representing adaptive filters in motion compensation. In intra frame coding it can be used for representing filters used for intra prediction. In both intra and inter frame coding it can be used for representing adaptive filters used for pre-, post- and loop filtering.

The bits used for the representation of for example 6 adaptive coefficients, can potentially be reduced by 17%. This can reduce the total bit rate by about 2% using the same amount of adaptability per pixel as for Quarter Common Intermediate Format (QCIF). If 2 adaptive filter coefficients are used the number of bits for the representation of the adaptive filter can potentially be reduced by about 50%.

The object of the invention is also achieved in an encoder for encoding adaptive filter coefficients, the encoder comprising first interface means for receiving adaptive filter coefficients, second interface means for outputting a bitstream of encoded adaptive filter coefficients, and processing means operatively connected to the first interface means and the second interface means respectively. The processing means is especially adapted for performing the steps in the above described method and its embodiments. The encoder may optionally have a third interface for receiving reference adaptive filter coefficients, where difference filter coefficients are encoded into the bitstream using prediction according to the invention.

The object is also achieved in a method of decoding a bitstream of encoded adaptive filter coefficients into a plurality of decoded adaptive filter coefficients. The method comprises the steps of entropy decoding the bitstream into adaptive filter coefficients, whereby the step of entropy decoding the bitstream into adaptive filter coefficients comprises the steps of entropy decoding a prediction error corresponding to an instance of the adaptive filter coefficients, entropy decoding remaining adaptive filter coefficients from the bitstream, determining a prediction for the instance of the adaptive filter coefficients from at least one of the remaining adaptive filter coefficients, and restoring the instance of the adaptive filter coefficients by adding the prediction error to the prediction.

The method of decoding the bitstream uses the same method of predicting a adaptive filter coefficient as the method of encoding the adaptive filter coefficients into the bitstream. However the predicted adaptive filter coefficients are used to reconstruct the actual adaptive filter coefficients by adding the decoded prediction error to the prediction to obtain the original adaptive filter coefficient.

In another embodiment of the method of decoding according to the invention adaptive filter coefficients may also be difference filter coefficients, whereby the method further comprises a step of determining a plurality of adaptive filter coefficients by adding reference adaptive filter coefficients to the corresponding difference filter coefficients.

In another embodiment of the method of decoding according to the invention, the adaptive filter coefficients are arranged in a matrix of adaptive filter coefficients having at least one symmetry axis. The step of determining at least one prediction of at least one adaptive filter coefficient comprises predicting at least one adaptive filter coefficient by mirroring a corresponding adaptive filter coefficient around said at least one symmetry axis of said matrix.

In an embodiment of the invention, the step of determining a prediction for the instance of the adaptive filter coefficients from at least one of the remaining adaptive filter coefficients comprises determining a sum of the remaining adaptive filter coefficients, determining the prediction by subtracting the sum from a constant. The constant is equal to the DC-gain of the adaptive filter. For difference filter coefficients the constant is equal to zero.

In another embodiment of the method of decoding according to the invention, the bitstream comprises a sub-matrix index. The method further comprises decoding the sub-matrix index, decoding at least one prediction error from the sub-matrix corresponding to the sub-matrix index, decoding the plurality of adaptive filter coefficients not corresponding to the prediction errors in the sub-matrix, determining predictions of adaptive filter coefficients from the plurality of adaptive filter coefficients corresponding to the prediction errors and reconstructing adaptive filter coefficients from the predictions of adaptive filter coefficients and the corresponding prediction errors.

In another embodiment of the method of decoding according to the invention, the method further comprises a step of further comprising a step of de-quantizing the adaptive filter coefficients.

The object of the invention is also achieved in a decoder for decoding a bitstream into adaptive filter coefficients. The decoder comprises first interface means for receiving the bitstream, second interface means for outputting decoded adaptive filter coefficients, and processing means operatively connected to the first interface means and the second interface means (405) respectively, especially adapted for performing the steps in the above described method of decoding a bitstream of encoded adaptive filter coefficients into adaptive filter coefficients.

In an embodiment of the invention, the decoder may further comprise a third interface operatively connected to the processing means for receiving reference adaptive filter coefficients, where difference filter coefficients are decoded from the bitstream using prediction according to the invention.

BRIEF DESCRIPTION OF THE DRAWINGS

FIG. 1b shows a block diagram of a process of decoding adaptive filter coefficients according to the state of the art, corresponding to the block diagram of FIG. 1a.

FIG. 2a shows a block diagram of a process of encoding adaptive filter coefficients according to an embodiment of the invention.

FIG. 2b shows a block diagram of a process of decoding adaptive filter coefficients according to an embodiment of the invention, corresponding to the block diagram of FIG. 2a.

FIG. 3b shows a block diagram of decoding adaptive filter coefficients using prediction according to an exemplary embodiment of the invention, corresponding to the block diagram of FIG. 3a.

FIG. 4a shows a block diagram of an encoder for performing a process of encoding adaptive filter coefficients according an embodiment of the invention corresponding to FIGS. 2a and 3a.

DETAILED DESCRIPTION

Figure 1A:
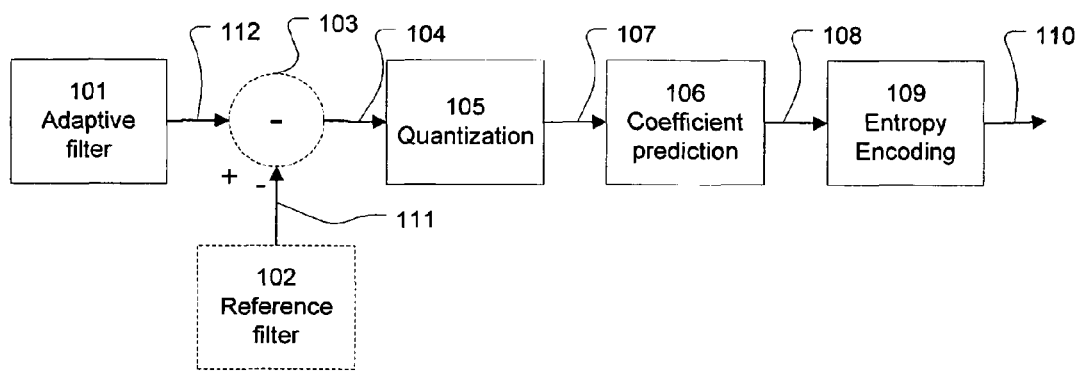
FIG. 1a shows a block diagram of a process of coding adaptive filter coefficients according to the state of the art.

In inter frame and intra frame prediction in video encoding and decoding, is used to establish a predicted block of pixels form already decoded pixels from a previous frame in inter frame prediction or from a current frame in intra frame prediction. Filtering or filter arithmatic using vector algebra is used to establish the predicted block from the previously decoded pixels. Adaptive filtering may be used to enable different filter strategies to be used depending on properties of the frame to be coded or on the content of the frame. Adaptive filters differ from standard filters in that the filter coefficients of adaptive filters are determined in the process of encoding video frames, whereas standard or reference filters are predetermined by standard, e.g. H.264 [1]. It is for this reason that adaptive filter coefficients need to be communicated by a video encoder to a corresponding video decoder to enable use of the same adaptive filter to obtain properly reconstructed video frames.

In adaptive filtering a filter function f is applied to a block of pixel values in a current frame to achieve filtered pixel values, as demonstrated by example in Equation 1, showing a filter having half-pel interpolation:

$$P(k,l) = \sum_{i=0}^{N-1}\sum_{j=0}^{M-1} F(i,j) X\left(k - i + \text{int}\left(\frac{N}{2}\right), l - j + \text{int}\left(\frac{M}{2}\right)\right),$$ Equation 1 wherein P(k,l) is a pixel at row k and column l of the filtered block, X is a frame of pixel values, F(i,j) is a value of a two dimensional spatial transfer function with N rows and M columns at position (i,j), $k_1$ and $l_1$ are offsets positioning the filtered block corresponding to the position of the current block in the frame of pixel values, int is the truncation on integer function.

In both inter frame prediction and loop filtering the filtering takes place inside a coding loop in video coding, as is described in [1]. In inter frame prediction, the frame of pixel values X is a previously decoded and reconstructed frame from another time instant than the time instant of the current block to be predicted. The position is also offset according to the motion between the frames. An example of using inter frame prediction with adaptive filters is shown in [2]. In the loop filtering, the frame of pixel values X is the currently reconstructed frame before display and storage for inter frame prediction. The loop filtered frame can then be used for display and for inter frame prediction.

In adaptive post-filtering in video coding [6] the filtering is outside the coding loop. In this example the block of pixel values X corresponds to a reconstructed block which can be used for inter frame prediction. Preferably the post-filtered images are then used for displaying the video.

In video encoding both information relating to the video frames to be encoded as well as parameters on how the encoding and decoding is to be performed are encoded into a bitstream, which may be decoded in order to accurately reconstruct the video frames. While using adaptive filtering, filter types and adaptive filter coefficients need to be encoded into the bitstream as well. These adaptive filter coefficients add bit capacity overhead to the bitstream thereby potentially reducing the overall bit rate. The encoding and subsequently decoding of adaptive filter coefficients should therefore be performed as efficient as possible.

An example of an adaptive filter in the context of inter frame prediction, similar to but more general than one of the filters given in [5], is shown below:

$$f = \begin{bmatrix} f_1 & 0 & 0 & 0 & 0 & f_7 \\ 0 & f_2 & 0 & 0 & f_8 & 0 \\ 0 & 0 & f_3 & f_9 & 0 & 0 \\ 0 & 0 & f_{10} & f_4 & 0 & 0 \\ 0 & f_{11} & 0 & 0 & f_5 & 0 \\ f_{12} & 0 & 0 & 0 & 0 & f_6 \end{bmatrix}$$ Equation 2 wherein $f_1, \ldots, f_{12}$ are adaptive filter coefficients.

In FIG. 1 a process of coding adaptive filter coefficients according to the state of the art is shown. Adaptive filter coefficients 112 of an adaptive filter 101 can be quantised 105, predicted 106 and entropy encoded 109 in an encoder for transmission in a bitstream 110 of encoded video frames before transmission to a compatible decoder. In prediction 106, some (quantised) adaptive filter coefficients 107 may be predicted based on coefficients from other adaptive filters [4]. By using prediction or estimation of adaptive filter coefficients from other sources in both the encoder and decoder, the transmission of corresponding actual adaptive filter coefficients may be omitted, thereby reducing the bit capacity overhead in the bitstream 110.

Entropy encoding 109 is well known in the art and is used for assigning a unique prefix or code to a symbol, whereby the number of bits of the code is determined by the probability of occurrence of the symbol. Examples of entropy encoding are Huffman coding, encoding by means of variable length codes (VLC) and context arithmetic entropy codes (CABAC).

The step of quantisation 105, wherein the number of values a adaptive filter coefficient may assume is limited, is optional, however normally the prediction 106 is made in the domain of quantised coefficients. Quantization of one adaptive filter coefficient $f_i$ is shown in Equation 3:

$$\tilde{f}_i = \text{sign}(f_i) * \text{int}(abs(f_i) * 2^B + 0.5)$$ Equation 3, wherein $abs(f_i)$ is the magnitude of $f_i$, $\text{sign}(f_i)$ is the sign of $f_i$, B is the number of bits used for quantizing the magnitude of $f_i$.

As an additional step, difference filter coefficients 104 can be constructed by subtracting/removing 103 reference adaptive filter coefficients of a reference filter 102 from the adaptive filter coefficients 112, similarly as done in previous art [2]. The reference filter may be a standard H.264 filter [1]. The subtraction 103 is shown in a general example, see Equation 4:

$$D = F - R$$ Equation 4, wherein D is a difference matrix containing the difference filter coefficients, F is the adaptive filter matrix and R is the reference filter matrix.

In full matrix notation in Equation 5:

$$\begin{bmatrix} d_1 & 0 & 0 & 0 & 0 & d_7 \\ 0 & d_2 & 0 & 0 & d_8 & 0 \\ 0 & 0 & d_3 & d_9 & 0 & 0 \\ 0 & 0 & d_{10} & d_4 & 0 & 0 \\ 0 & d_{11} & 0 & 0 & d_5 & 0 \\ d_{12} & 0 & 0 & 0 & 0 & d_6 \end{bmatrix} =$$

$$\begin{bmatrix} f_1 & 0 & 0 & 0 & 0 & f_7 \\ 0 & f_2 & 0 & 0 & f_8 & 0 \\ 0 & 0 & f_3 & f_9 & 0 & 0 \\ 0 & 0 & f_{10} & f_4 & 0 & 0 \\ 0 & f_{11} & 0 & 0 & f_5 & 0 \\ f_{12} & 0 & 0 & 0 & 0 & f_6 \end{bmatrix} - \begin{bmatrix} r_1 & 0 & 0 & 0 & 0 & r_7 \\ 0 & r_2 & 0 & 0 & r_8 & 0 \\ 0 & 0 & r_3 & r_9 & 0 & 0 \\ 0 & 0 & r_{10} & r_4 & 0 & 0 \\ 0 & r_{11} & 0 & 0 & r_5 & 0 \\ r_{12} & 0 & 0 & 0 & 0 & r_6 \end{bmatrix},$$

Equation 5 wherein $d_1, \ldots d_{12}$ are difference filter coefficients, $f_1, \ldots f_{12}$ are adaptive filter coefficients, and $r_1, \ldots r_{12}$ are reference adaptive filter coefficients.

A practical example of an H.264-like reference filter used in [5] is shown in Equation 6:

$$R = \begin{bmatrix} 1 & 0 & 0 & 0 & 0 & 1 \\ 0 & -5 & 0 & 0 & -5 & 0 \\ 0 & 0 & 52 & 52 & 0 & 0 \\ 0 & 0 & 20 & 20 & 0 & 0 \\ 0 & -5 & 0 & 0 & -5 & 0 \\ 1 & 0 & 0 & 0 & 0 & 1 \end{bmatrix} \times \frac{1}{128}$$

Equation 6

The obtained difference filter coefficients 104 may be quantised 105. Some coefficients can be predicted 106 from coefficients of other spatial positions by exploiting symmetry [5]. In this case the number of coefficients to be encoded is reduced. Exploiting symmetry in the definition of adaptive filter coefficients and difference filter coefficients is shown in Equation 9 where adaptive filter coefficients are mirrored around a vertical axis in the middle of the filter matrix. Some other examples of exploiting symmetry can be found in [3, 4].

Figure 1B:
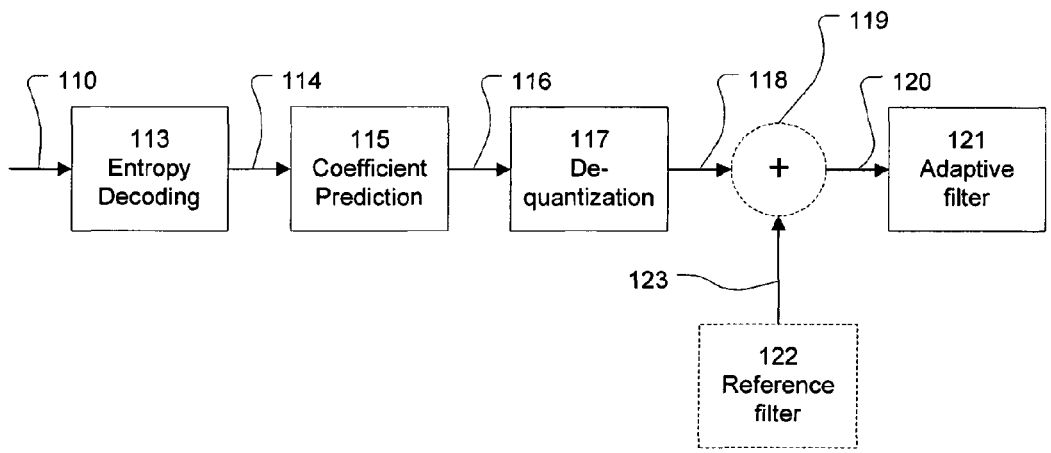

In FIG. 1*b* an example of a process of decoding adaptive filter coefficients according to the state of the art is illustrated. A bitstream 110 is entropy decoded 113 to obtain quantised adaptive filter coefficients 114, coefficient prediction 115 and optionally de-quantization 117 are performed to obtain adaptive filter coefficients 123. In coefficient prediction 115 according to the state of the art adaptive filter coefficients may also be predicted based on coefficients from other adaptive filters as is disclosed in [4].

A prediction $\hat{f}_i$ of a adaptive filter coefficient $f_i$ can be based on un-quantised adaptive filter coefficients $f_i$ or on quantised adaptive filter coefficients $\bar{f}_i$, on un-quantised difference coefficients $d_i$ or on quantised difference coefficients $\bar{d}_i$. In the following examples the prediction of adaptive filter coefficients is based on quantised adaptive filter coefficients.

FIG. 2*a* shows a process of encoding adaptive filter coefficients according to an embodiment of the invention.

Step 106 in FIG. 1*a* is enhanced such that in predicting step 201 the predicted adaptive filter coefficient $\hat{f}_i$ 202 corresponding to adaptive filter coefficient $\bar{f}_i$ is produced from at least one of remaining adaptive filter coefficients 206. An adaptive filter coefficients $\bar{f}_i$ 204 may be predicted in various ways. For example an adaptive filter coefficient $\bar{f}_i$ 204 may be predicted from another adaptive filter coefficient 206 using symmetry. In symmetry adaptive filter coefficients are predicted using matrix notation of the filter $\overline{F}$, whereby filter coefficients are predicted by mirroring filter coefficients over an axis of symmetry in the matrix.

A prediction error $e_i$ 205 is established by subtracting the 203 the prediction $\hat{f}_i$ 202 from the actual adaptive filter coefficient $\bar{f}_i$ 204. The prediction error $e_i$ 205 is encoded in step 109 together with the remaining actual adaptive filter coefficients 206 for which no prediction error $e_i$ 205 was established.

FIG. 2*b* shows a process of decoding adaptive filter coefficients according to an embodiment of the invention.

In this embodiment, the bitstream 110 is entropy decoded in step 113 as described in FIG. 1*b*. This step reverses the entropy decoding in step 109 of FIG. 2*a*. Encoded symbols 108 comprising prediction error 205 and remaining adaptive filter coefficients 206, input in step 109, are restored from the encoded bits in the bitstream 110. The output 114 of the entropy decoding step 113 contains decoded prediction error $e_i$ 209 together with the decoded remaining adaptive filter coefficients 211 for which no prediction error $e_i$ 205 was established. The coefficient prediction step 115 of FIG. 1*b* is enhanced such that in prediction step 208 the predicted adaptive filter coefficient $\hat{f}_i$ 210 corresponding to prediction error $e_i$ 209 is produced by adding 207 the predicted adaptive filter coefficient $\hat{f}_i$ 210 and the decoded prediction error $e_i$ 209, the decoded actual adaptive filter coefficient $f_i$ 212 is reproduced. Together with the decoded remaining adaptive filter coefficients 211, the complete quantised filter $\overline{F}$ can be reconstructed.

Referring to FIG. 1*b*, quantised filter $\overline{F}$ may be de-quantised in optional step 117 and depending on whether adaptive filter coefficients of difference filter coefficients were coded, the adaptive filter $F$ 121 may be restored by adding 119 the reference filter $R$ 122.

An example of predicting adaptive filter coefficients within a filter using symmetry is shown in Equation 7:

Equation 7

$$\overline{F} = \begin{bmatrix} \overline{f}_1 & 0 & 0 & 0 & 0 & \overline{f}_7 \\ 0 & \overline{f}_2 & 0 & 0 & \overline{f}_8 & 0 \\ 0 & 0 & \overline{f}_3 & \overline{f}_9 & 0 & 0 \\ 0 & 0 & \overline{f}_{10} & \overline{f}_4 & 0 & 0 \\ 0 & \overline{f}_{11} & 0 & 0 & \overline{f}_5 & 0 \\ \overline{f}_{12} & 0 & 0 & 0 & 0 & \overline{f}_6 \end{bmatrix}$$

$$= \begin{bmatrix} \overline{f}_1 & 0 & 0 & 0 & 0 & \hat{f}_7 + e_7 \\ 0 & \overline{f}_2 & 0 & 0 & \hat{f}_8 + e_8 & 0 \\ 0 & 0 & \overline{f}_3 & \hat{f}_9 + e_9 & 0 & 0 \\ 0 & 0 & \hat{f}_{10} + e_{10} & \overline{f}_4 & 0 & 0 \\ 0 & \hat{f}_{11} + e_{11} & 0 & 0 & \overline{f}_5 & 0 \\ \hat{f}_{12} + e_{12} & 0 & 0 & 0 & 0 & \overline{f}_6 \end{bmatrix}$$

-continued $$
= \begin{bmatrix}
\bar{f}_1 & 0 & 0 & 0 & 0 & \bar{f}_1+e_7 \\
0 & \bar{f}_2 & 0 & 0 & \bar{f}_2+e_8 & 0 \\
0 & 0 & \bar{f}_3 & \bar{f}_3+e_9 & 0 & 0 \\
0 & 0 & \bar{f}_4+e_{10} & \bar{f}_4 & 0 & 0 \\
0 & \bar{f}_5+e_{11} & 0 & 0 & \bar{f}_5 & 0 \\
\bar{f}_6+e_{12} & 0 & 0 & 0 & 0 & \bar{f}_6
\end{bmatrix},
$$

wherein $e_i$ the prediction error corresponding to coefficient $\bar{f}_i$. In the example the adaptive filter coefficients along the diagonal from top-right to bottom-left are predicted by the adaptive filter coefficients on the diagonal from top-left to bottom-right in matrix F using symmetry. In the example Equation 8 is used:

$$\hat{f}_i = \bar{f}_{i-6}, i \in [7,12] \qquad \text{Equation 8}$$

So the prediction $\hat{f}_7$ of $\bar{f}_7$ is equal to $\bar{f}_1$ using symmetry, whereby $e_7$ is the error between the actual value of $\bar{f}_7$ and its prediction $\hat{f}_7$. The prediction method, the coefficients $\bar{f}_1 \ldots \bar{f}_6$ and the prediction errors $e_7 \ldots e_{12}$ may be encoded into the bitstream 110, where $\bar{f}_7 \ldots \bar{f}_{12}$ are not encoded. Since the values of the prediction errors $e_7 \ldots e_{12}$ are much smaller than of the associated adaptive filter coefficients $\bar{f}_7 \ldots \bar{f}_{12}$, less bits are needed in total to encode the filter F. The prediction method may be linked to a filter type as specified by the H.264 standard [1], so instead of the prediction method, the filter type may be encoded in the bitstream 110. An example of a filter type is a filter for specific sub-pel position according to [5].

Decoding corresponding to the encoding according to Equation 7 starts with identifying the filter type and then decode corresponding coefficients $\bar{f}_1 \ldots \bar{f}_6$ and prediction errors $e_7 \ldots e_{12}$ from the bitstream 110. Then each of the coefficients $\bar{f}_7 \ldots \bar{f}_{12}$ are predicted the same way as in the encoding process using symmetry according Equation 8. The adaptive filter coefficients $\bar{f}_7 \ldots \bar{f}_{12}$ may then be reconstructed according to Equation 9:

$$\bar{f}_i = \hat{f}_i + e_i = \bar{f}_{i-6} + e_i, i \in [7,12] \qquad \text{Equation 9}$$

Figure 3A:
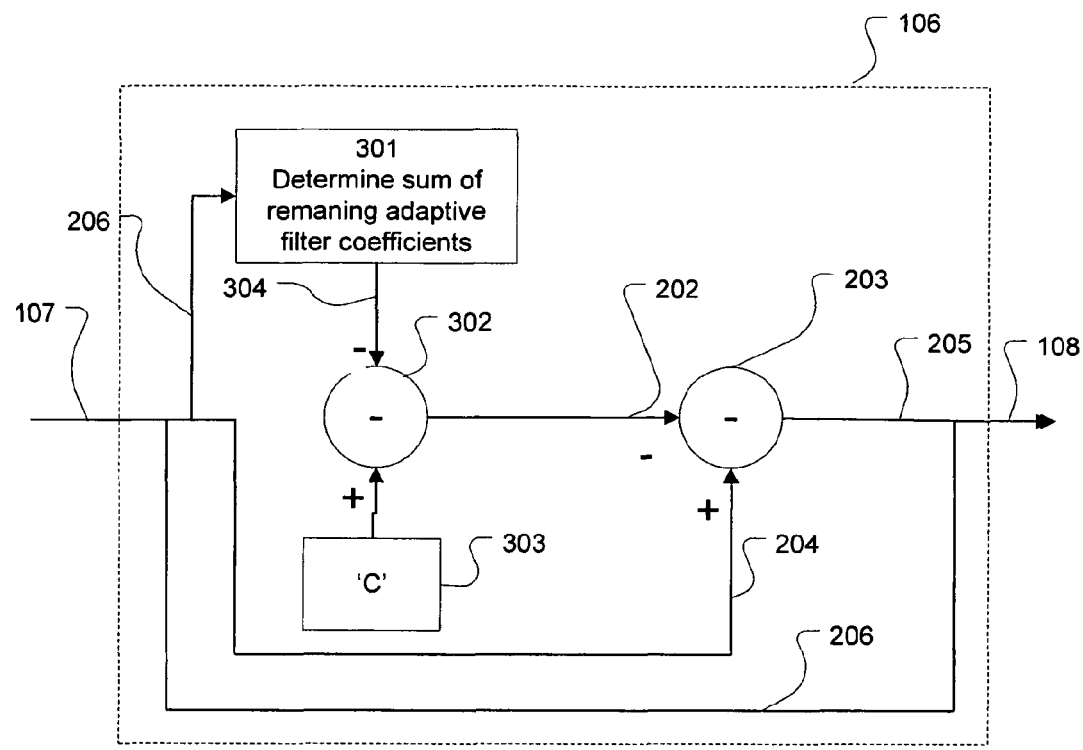
FIG. 3a shows a block diagram of encoding a adaptive filter coefficient according to an exemplary embodiment of the invention.

FIG. 3a shows a block diagram of encoding a adaptive filter coefficient according to an exemplary embodiment of the invention. It is noted that in inter frame prediction, e.g. motion prediction, the average pixel value (DC) or luminance of a pixel in the prediction should be the same as the average pixel value (DC) or luminance of the corresponding pixel in the reference frame from where the prediction was made. Using this assumption, the DC-gain of (un-quantised) adaptive filters should be one and therefore the adaptive filter coefficients should typically sum up to one, e.g. not change the average pixel value (DC). In the case of difference filter coefficients 104, where a reference filter has been subtracted from the adaptive filter as shown in Equation 4 and 5, this is manifested by having difference filter coefficients 104 summing up to zero.

Accordingly, a good strategy for encoding adaptive filter coefficients is to start encoding coefficients 108 that are small since they requires fewer bits in representation than the number of bits required for the encoding of large coefficients. The larger coefficients can be predicted based on knowledge of already coded smaller coefficients. In this way large coefficients can be predicted and it is only needed to encode a relatively small coefficient prediction error. So a prediction $\hat{f}_i$ of adaptive filter coefficient $\bar{f}_i$ may further be based on the sum of the previously decoded difference filter coefficients. The prediction is such that the sum including the prediction results in an adaptive filter with maintained DC level, e.g. no amplification of pixel values.

In FIG. 3a, a predicted adaptive filter coefficient 202 of a adaptive filter coefficient 204 is determined by determining 301 the sum 304 of the remaining adaptive filter coefficients 206 and subtracting 302 the sum 304 from constant C 303, the constant C 303 being the DC-gain of the filter to be encoded. The predicted adaptive filter coefficient 202 is then subtracted 203 from the actual adaptive filter coefficient 204. The difference is the prediction error $e_i$ 205, which may then be entropy encoded 109 together with the remaining adaptive filter coefficients 206.

Constant C refers to the adaptive filter DC-gain, being the total sum of adaptive filter coefficients. For un-quantised adaptive filter coefficients 112 C=1, for a difference filter coefficients 104, unquantised but also quantised, C=0 since both the adaptive filter coefficients and the reference adaptive filter coefficients should sum up to one. If each adaptive filter coefficient is quantised with B bits, then for quantised adaptive filter coefficients 107 C=$2^B$. If each of the quantised adaptive filter coefficients 107 is quantised differently C=max$(2^{B_1}, \ldots, 2^{B_i} \ldots 2^{B_N})=2^{B_{max}}$ where N is the number of coefficients and $B_{max}$ is the number of bits used for the finest quantization of a adaptive filter coefficient of the filter. For quantised difference filter coefficients C=0.

If a different number of $B_i$ bits are used in the quantisation of each of the adaptive filter coefficients $f_i$ or difference filter coefficients each of the coefficient needs to be scaled before summing them up. The scaling for the i:th adaptive filter coefficient is defined as $2^{B_{max}} - 2^{B_i}$, wherein $B_{max}$ is the number of bits used for the finest quantization and $B_i$ is the number of bits used for quantizing adaptive filter coefficient $f_i$.

Figure 3B:
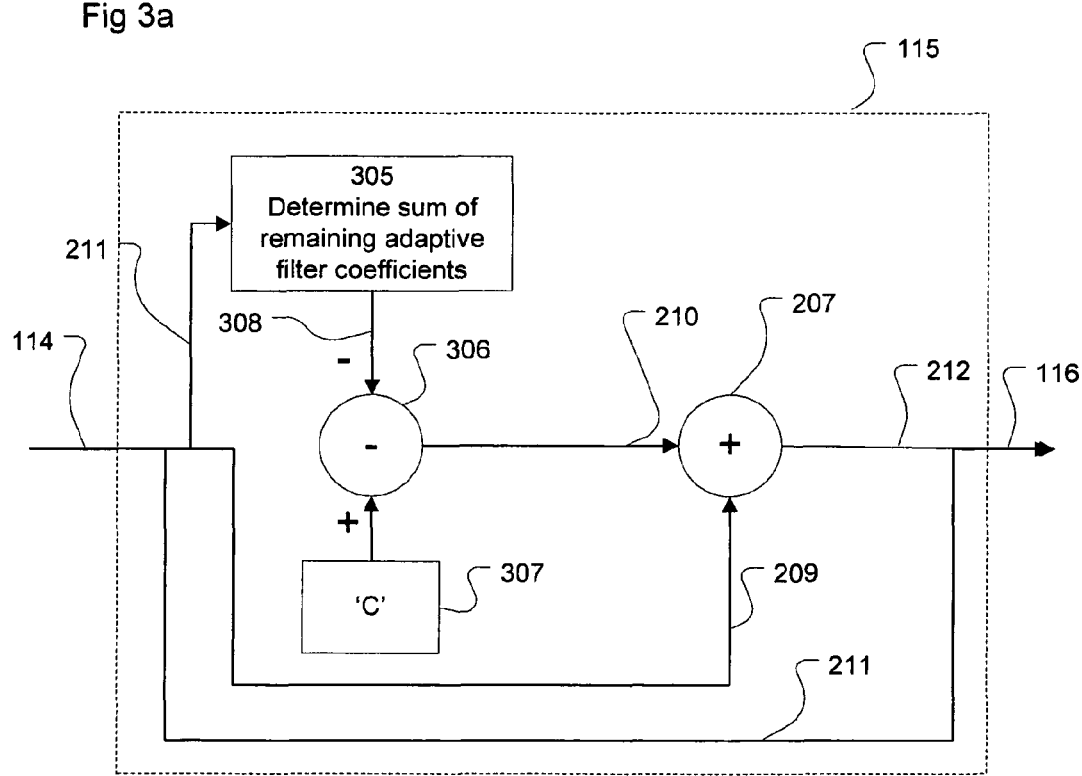

FIG. 3b shows a corresponding example of decoding adaptive filter coefficients using prediction according to the embodiment of the invention of FIG. 3a.

Decoded prediction error 209 together with the decoded remaining adaptive filter coefficients 211 form the result 114 of entropy decoding step 113. A decoded adaptive filter coefficient prediction $\hat{f}_i$ 210 is established using the remaining adaptive filter coefficients 211 by determining 305 a sum 308 of the decoded remaining adaptive filter coefficients 211 and by subtracting 306 the sum 308 from constant C 307, the constant C 307 being the DC-gain of the filter as in the encoding example of FIG. 3a. By adding 207 the decoded adaptive filter coefficient prediction $\hat{f}_i$ 210 to the decoded prediction error $e_i$ 209, the decoded original adaptive filter coefficient $\bar{f}_i$ 212 is obtained. Decoded original adaptive filter coefficient $\bar{f}_i$ 212, together with the decoded remaining adaptive filter coefficients 211 form the input 116 of the optional de-quantisation step 116 of FIG. 1b and may be used to restore filter F, optionally using reference filter R as described above under FIG. 2b.

According to a further embodiment of the invention, the adaptive filter coefficients of the filter matrix can be subdivided into one or more sub-matrices having coefficients to be predicted, by grouping the coefficients having those coefficients with highest expected bit encoding cost. Each matrix can contain at least one coefficient. The matrix F can be subdivided based on a pre-defined criterion. This criterion may be linked to the filter type. Examples of such criteria can be the magnitude of coefficients and the ranking order of the coefficients.

As a general rule it is advantageous to group the largest adaptive filter coefficients in the matrix having the adaptive filter coefficients to be predicted. Also these adaptive filter coefficients preferable have a similar magnitude. It is unadvantageous to mix adaptive filter coefficients with large difference in magnitude.

Another example of subdividing a filter matrix is using the location of the coefficients in the filter as shown in Equation 7. The adaptive filter matrix $\overline{F}$ of Equation 7 may for example be subdivided into two sub-matrices $\overline{S}_1$ and $\overline{S}_2$. $\overline{S}_1$ and $\overline{S}_2$ may have coefficients in common so $\overline{S}_1$ and $\overline{S}_2$ may be overlapping as shown below:

$$\overline{S}_1 = \begin{bmatrix} - & - & - & - & - & - \\ - & - & - & - & - & - \\ - & - & \overline{f}_3 & \overline{f}_9 & - & - \\ - & - & - & - & - & - \\ - & - & - & - & - & - \\ - & - & - & - & - & - \end{bmatrix}, \quad \text{Equation 10a}$$

$$\overline{S}_2 = \begin{bmatrix} - & - & - & - & - & - \\ - & - & - & - & - & - \\ - & - & \overline{f}_3 & \overline{f}_9 & - & - \\ - & - & \overline{f}_{10} & \overline{f}_4 & - & - \\ - & - & - & - & - & - \\ - & - & - & - & - & - \end{bmatrix}$$

The remaining coefficients are stored in corresponding matrix $\overline{T}_1, \overline{T}_2$ respectively:

$$\overline{T}_1 = \begin{bmatrix} \overline{f}_1 & - & - & - & - & \overline{f}_7 \\ - & \overline{f}_2 & - & - & \overline{f}_8 & - \\ - & - & - & - & - & - \\ - & - & \overline{f}_{10} & \overline{f}_4 & - & - \\ - & \overline{f}_{11} & - & - & \overline{f}_5 & - \\ \overline{f}_{12} & - & - & - & - & \overline{f}_6 \end{bmatrix}, \quad \text{Equation 10b}$$

$$\overline{T}_2 = \begin{bmatrix} \overline{f}_1 & - & - & - & - & \overline{f}_7 \\ - & \overline{f}_2 & - & - & \overline{f}_8 & - \\ - & - & - & - & - & - \\ - & - & - & - & - & - \\ - & \overline{f}_{11} & - & - & \overline{f}_5 & - \\ \overline{f}_{12} & - & - & - & - & \overline{f}_6 \end{bmatrix}$$

A cost function Y may be determined for the number of bits needed to encode all adaptive filter coefficients, as depicted in Equation 11:

$$\text{Cost}_i = Y(\overline{S}_i, \overline{T}_i) \quad \text{Equation 11}$$

Alternatively the cost can also be based on distortion. An example of distortion is the sum of the absolute or mean square error between original and filtered pixel values. Filtered pixel values can be obtained as in Equation 1 or Equation 9.

The cost function Y is evaluated for each combination ($\overline{S}_i$, $\overline{T}_i$). The combination ($\overline{S}_i, \overline{T}_i$) which gives the least total cost will be selected. The index i of the selected combination ($\overline{S}_i$, $\overline{T}_i$) is encoded into the bitstream 110. The coefficients of the selected matrix $\overline{S}_i$ are predicted after all coefficients outside the selected matrix $\overline{S}_i$ have been encoded. If $\overline{S}_1$ is the selected matrix a prediction of $\hat{f}_3$ is made as the constant C minus the sum of the coefficients in $\overline{T}_1$, whereby each coefficient is scaled with the number of occurrences in the filter and the result is divided by the number of coefficients in the selected matrix, as shown in Equation 12:

$$\hat{f}_3 = \frac{C - (\overline{f}_1 + \overline{f}_2 + \overline{f}_4 + \overline{f}_5 + \overline{f}_6 + \overline{f}_7 + \overline{f}_8 + \overline{f}_{10} + \overline{f}_{11} + \overline{f}_{12})}{2} \quad \text{Equation 12}$$

The prediction error $e_3$ is determined as:

$$e_3 = \overline{f}_3 - \hat{f}_3 \quad \text{Equation 13}$$

The prediction error $e_3$ is encoded into the bitstream 110. Next step is to predict the remaining coefficients in the selected matrix $\overline{S}_1$, e.g. $\overline{f}_9$. The prediction of $\hat{f}_9$ is C minus the sum of the coefficients in $\overline{T}_1$ and $\overline{f}_3$ each scaled with the number of occurrences in the filter and the result is divided by the number of remaining coefficients in the selected matrix:

$$\hat{f}_9 = C - (\overline{f}_1 + \overline{f}_2 + \overline{f}_3 + \overline{f}_4 + \overline{f}_5 + \overline{f}_6 + \overline{f}_7 + \overline{f}_8 + \overline{f}_{10} + \overline{f}_{11} + \overline{f}_{12}) \quad \text{Equation 14}$$

The prediction error $e_9$ is:

$$e_9 = \overline{f}_9 - \hat{f}_9 \quad \text{Equation 15}$$

The prediction error $e_9$ is then encoded into the bitstream 110.

The decoding of adaptive filter coefficients of the encoding example corresponding to Equations 10a and 10b can be described as follows. First the selected matrix $\overline{S}_i$ is decoded from the bitstream 110. Then the coefficients outside the selected matrix $\overline{S}_i$ are decoded. If for example the selected matrix is $\overline{S}_1$ the decoding will result in the quantised adaptive filter coefficients $\overline{f}_1, \overline{f}_2, \overline{f}_4, \overline{f}_5, \overline{f}_6, \overline{f}_7, \overline{f}_8, \overline{f}_{10}, \overline{f}_{11}$ and $\overline{f}_{12}$. The prediction of $\overline{f}_3$ is can then be evaluated as follow:

$$\hat{f}_3 = \frac{C - (\overline{f}_1 + \overline{f}_2 + \overline{f}_4 + \overline{f}_5 + \overline{f}_6 + \overline{f}_7 + \overline{f}_8 + \overline{f}_{10} + \overline{f}_{11} + \overline{f}_{12})}{2}, \quad \text{Equation 16}$$

wherein $C = 2^B$. The prediction error $e_3$ is then decoded from the bitstream 110 The quantised value of $\overline{f}_3$ can then be generated as:

$$\overline{f}_3 = e_3 + \hat{f}_3 \quad \text{Equation 17}$$

The prediction of $\overline{f}_9$ is then:

$$\hat{f}_9 = C - (\overline{f}_1 + \overline{f}_2 + \overline{f}_3 + \overline{f}_4 + \overline{f}_5 + \overline{f}_6 + \overline{f}_7 + \overline{f}_8 + \overline{f}_{10} + \overline{f}_{11} + \overline{f}_{12}) \quad \text{Equation 18}$$

Thus all adaptive filter coefficients have been decoded and reconstructed.

When filtering is implemented in fixed point arithmetic which is usually the case, the filtering shown in Equation 1 can be performed directly using the quantised values as:

$$P(k, l) = \left( \sum_{i=0}^{N-1} \sum_{j=0}^{M-1} \overline{F}(i, j) R\left(k - i + \text{int}\left(\frac{N}{2}\right), l - j + \text{int}\left(\frac{M}{2}\right)\right) + 2^{B-1} \right) >> B \quad \text{Equation 19}$$

Where >> corresponds to down shift with B bits or similarly division by $2^B$, and $2^{B-1}$ corresponds to a rounding factor.

In another example, mirroring of adaptive filter coefficients is used in the definition of adaptive filter coefficients as described in for one of the filter types in [5]. This filter is depicted in Equation 20:

$$\bar{F} = \begin{bmatrix} \bar{f}_1 & 0 & 0 & 0 & 0 & \bar{f}_7 \\ 0 & \bar{f}_2 & 0 & 0 & \bar{f}_8 & 0 \\ 0 & 0 & \bar{f}_3 & \bar{f}_9 & 0 & 0 \\ 0 & 0 & \bar{f}_{10} & \bar{f}_4 & 0 & 0 \\ 0 & \bar{f}_{11} & 0 & 0 & \bar{f}_5 & 0 \\ \bar{f}_{12} & 0 & 0 & 0 & 0 & \bar{f}_6 \end{bmatrix} =$$

$$\begin{bmatrix} \bar{f}_1 & 0 & 0 & 0 & 0 & \bar{f}_1 \\ 0 & \bar{f}_2 & 0 & 0 & \bar{f}_2 & 0 \\ 0 & 0 & \bar{f}_3 & \bar{f}_3 & 0 & 0 \\ 0 & 0 & \bar{f}_4 & \bar{f}_4 & 0 & 0 \\ 0 & \bar{f}_5 & 0 & 0 & \bar{f}_5 & 0 \\ \bar{f}_6 & 0 & 0 & 0 & 0 & \bar{f}_6 \end{bmatrix}$$

Equation 20

As described above the adaptive filter matrix $\bar{F}$ can be divided into for example two sub matrices $\bar{S}_1$, $\bar{S}_2$ for the central coefficients of the filter. $\bar{S}_1$ and $\bar{S}_2$ may again be overlapping such that they have coefficients in common.

$$\bar{S}_1 = \begin{bmatrix} - & - & - & - & - & - \\ - & - & - & - & - & - \\ - & - & \bar{f}_3 & \bar{f}_3 & - & - \\ - & - & - & - & - & - \\ - & - & - & - & - & - \\ - & - & - & - & - & - \end{bmatrix},$$

Equation 21a $$\bar{S}_2 = \begin{bmatrix} - & - & - & - & - & - \\ - & - & - & - & - & - \\ - & - & \bar{f}_3 & \bar{f}_3 & - & - \\ - & - & \bar{f}_4 & \bar{f}_4 & - & - \\ - & - & - & - & - & - \\ - & - & - & - & - & - \end{bmatrix}$$

The remaining coefficients are stored in corresponding matrix $T_1, T_2$ respectively:

$$\bar{T}_1 = \begin{bmatrix} \bar{f}_1 & - & - & - & - & \bar{f}_1 \\ - & \bar{f}_2 & - & - & \bar{f}_2 & - \\ - & - & - & - & - & - \\ - & - & \bar{f}_4 & \bar{f}_4 & - & - \\ - & \bar{f}_5 & - & - & \bar{f}_5 & - \\ \bar{f}_6 & - & - & - & - & \bar{f}_6 \end{bmatrix},$$

Equation 21b $$\bar{T}_2 = \begin{bmatrix} \bar{f}_1 & - & - & - & - & \bar{f}_1 \\ - & \bar{f}_2 & - & - & \bar{f}_2 & - \\ - & - & - & - & - & - \\ - & - & - & - & - & - \\ - & \bar{f}_5 & - & - & \bar{f}_5 & - \\ \bar{f}_6 & - & - & - & - & \bar{f}_6 \end{bmatrix}$$

The cost function is evaluated for each combination $(\bar{S}_i, \bar{T}_i)$. The combination $(\bar{S}_i, \bar{T}_i)$ which gives the least total cost will be selected. The index i of the selected combination $(\bar{S}_i, \bar{T}_i)$ is encoded into the bitstream 110. The coefficients of the selected matrix $\bar{S}_i$ are predicted after all coefficients outside the selected matrix $\bar{S}_i$ have been encoded. If $\bar{S}_2$ is the selected matrix a prediction $\hat{f}_4$ of $\bar{f}_4$ is made as a constant C minus the sum of the coefficients in $T_2$, whereby each coefficient is scaled with the number of occurrences in the filter and the result is divided by the number of coefficients in the selected matrix:

$$\hat{f}_4 = \frac{C - (2*\bar{f}_1 + 2*\bar{f}_2 + 2*\bar{f}_5 + 2*\bar{f}_6)}{4}$$

Equation 22

The prediction error $e_4$ is determined as:

$$e_4 = \bar{f}_4 - \hat{f}_4$$

Equation 23

The prediction error $e_4$ is encoded into the bitstream 110. Next step is to predict the remaining coefficients in the selected matrix $\bar{S}_2$, e.g. $\bar{f}_3$. The prediction of $\hat{f}_3$ is C minus the sum of the coefficients in $T_2$ and $\bar{f}_4$ each scaled with the number of occurrences in the filter and the result is divided by the number of remaining coefficients in the selected matrix:

$$\hat{f}_3 = \frac{C - (2*\bar{f}_1 + 2*\bar{f}_2 + 2*\bar{f}_4 + 2*\bar{f}_5 + 2*\bar{f}_6)}{2}$$

Equation 24

The prediction error $e_3$ is:

$$e_3 = \bar{f}_3 - \hat{f}_3$$

Equation 25

The prediction error $e_3$ is then encoded into the bitstream 110.

The decoding procedure of adaptive filter coefficients corresponding to the example of Equations 21a and 21b can be described as follows:

First the selected matrix $\bar{S}_i$ is decoded from the bitstream 110. Then the coefficients outside the selected matrix $\bar{S}_i$ are decoded. If the selected matrix is $\bar{S}_1$ this will result in the quantised adaptive filter coefficients $\bar{f}_1, \bar{f}_2, \bar{f}_4, \bar{f}_5$ and $\bar{f}_6$. The prediction $\hat{f}_3$ of $\bar{f}_3$ is then:

$$\hat{f}_3 = \frac{C - (2*\bar{f}_1 + 2*\bar{f}_2 + 2*\bar{f}_4 + 2*\bar{f}_5 + 2*\bar{f}_6)}{2}$$

Equation 26

The prediction error $e_3$ is then decoded from the bitstream 110. The quantised adaptive filter coefficient $\bar{f}_3$ can then be generated as:

$$\bar{f}_3 = e_3 + \hat{f}_3$$

Equation 27

With decoding $e_3$ and predicting $\hat{f}_3$ all quantised adaptive filter coefficients $\bar{f}_1, \ldots, \bar{f}_6$ are available. Using mirroring according to Equation 20 the corresponding coefficients $f_1, \ldots, \hat{f}_{12}$ may be determined, completing decoding and reconstructing adaptive filter $\overline{F}$.

It will be clear to the skilled person that all cases where adaptive filter coefficients are addressed, similarly difference filter coefficients can be taken or vice versa. The above described teachings may apply not only to 6×6 filter matrices but also to filter matrices of other sizes and ratios.

When prediction and encoding of adaptive filter coefficients is used according to any of the methods described above, this may be notified by the encoder to the decoder, for example by inserting a flag or notification into the bitstream 110. The notification may be linked to the filter type as described above. The encoder selects the method that costs least number of bits to encode coefficients of a specific filter.

Figure 4A:
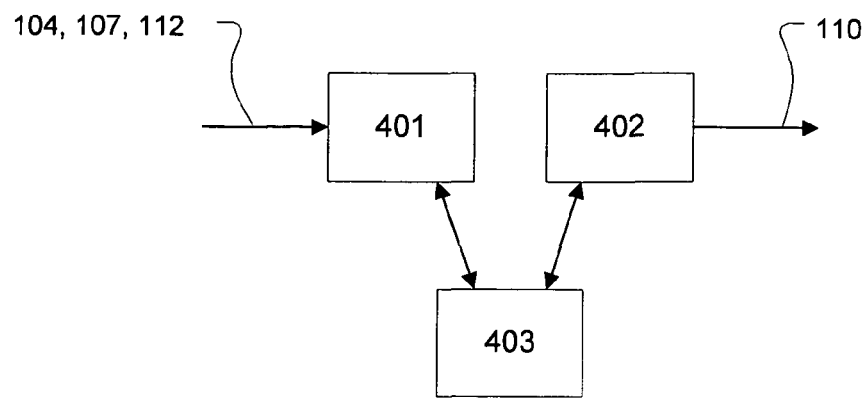

FIG. 4a shows a block diagram of an encoder for performing a process of encoding adaptive filter coefficients according an embodiment of the invention corresponding to FIGS. 2a and 3a.

An encoder for use in the above described method according to the invention may comprise a first interface 401 for receiving adaptive filter coordinates 112. The first interface 401 may for example be a variable in a computer memory, a parallel interface of serial interface suitable for receiving the adaptive filter coefficients from another process. The encoder may further have a second interface 402, technically similar to the first interface for outputting the bitstream 110 of encoded adaptive filter coefficients. The encoder may optionally have a third interface, technically similar to the first and second interface, for receiving reference adaptive filter coefficients. The encoder may further comprise processing 403 means such as a data processor and memory, the memory loaded with computer instructions specially adapted for causing the processor perform the steps of the method of encoding the adaptive filter coefficients as described above. The processing means 403 may also comprise dedicated hardware for performing at least part of the encoding process.

The processing means 403 controls the first interface 401 such that the adaptive filter coefficients 104, 107, 112 can be received and processed and encoded into bitstream 110 by the processing means 403. The adaptive filter coefficients 104, 107, 112 may for example be received via a variable in a computer memory, a parallel port or serial port suitable for receiving the adaptive filter coefficients 104, 107, 112. The processing means 403 further controls the second interface 402, such that the bitstream 110 obtained by the processing as described above may be output via interface 402 to be used in decoding the bitstream 110 into decoded video frames. The bitstream 110 may for example be written as data in a memory, a parallel port or a serial port for further use. Likewise the third interface may be controlled by the processing means 403 in order to obtain the reference adaptive filter coefficients 111. These reference adaptive filter coefficients 111 may for example be read from a memory, a parallel port or a serial port.

Figure 4B:
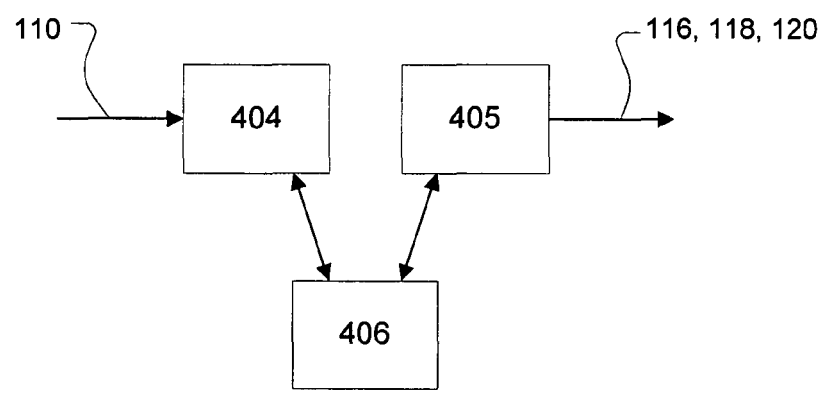
FIG. 4b shows a block diagram of a decoder for performing a process of decoding adaptive filter coefficients according an embodiment of the invention corresponding to FIGS. 2b and 3b.

FIG. 4b shows a block diagram of a decoder for performing a process of decoding adaptive filter coefficients according an embodiment of the invention corresponding to FIGS. 2b and 3b.

A decoder for use in the above described method according to the invention may comprise a first interface 404 for receiving a bitstream 110 of encoded adaptive filter coefficients from an encoder as described in relation to FIG. 4a. The decoder may further have a second interface 405, technically similar to the first interface 404 for outputting the decoded adaptive filter coefficients 120. The decoder may optionally have a third interface, technically similar to the first and second interface, for receiving reference adaptive filter coefficients. The decoder may further comprise processing means 406 such as a data processor and memory, the memory loaded with computer instructions specially adapted for causing the processor perform the steps of the method of decoding the adaptive filter coefficients from the bitstream 110 as described above. The processing means 406 may also comprise dedicated hardware for performing at least part of the decoding process.

The processing means 406 controls the first interface 404 such that the bitstream 110 can be received and processed by the processing means 406. The bitstream 110 may for example be received via a variable in a computer memory, a parallel port or serial port suitable for receiving the bitstream 110 of encoded adaptive filter coefficients. The processing means 406 further controls the second interface 405, such that the decoded adaptive filter coefficients 116, 118, 121, obtained by the processing as described above may be output to be used in decoding the bitstream 110 into decoded video frames. The decoded adaptive filter coefficients may for example be written as a variable in a memory, a parallel port or a serial port for further use. Likewise the third interface may be controlled by the processing means 406 in order to obtain the reference adaptive filter coefficients 123. These reference adaptive filter coefficients 123 may for example be read from a memory, a parallel port or a serial port.

The above described embodiments are exemplary only. A skilled person will understand that these embodiments may be changed, modified or deviated from without departing from the scope of the claims set out below.

ABBREVIATIONS

H.264—Video coding standard
DC—average luminance or chrominance value in a region

REFERENCES

[1] ITU-T Rec. H.264/ISO/IEC MPEG 14496-10, 2003
[2] Y. Vatis, B. Edler, D. T. Nguyen, J. Ostermann, "Two-dimensional non-separable Adaptive Wiener Interpolation Filter for H.264/AVC", ITU-T SGI 6/Q.6 Doc. VCEG-Z17, Busan, South Korea, April 2005
[3] "Syntax of adaptive filter coefficients in the KTA reference model", VCEG-AFO9, ITU-T, Study group 16, Question 6, April 2007
[4] "Separable Adaptive Interpolation Filter", COM16-C219, Matsushita, July 2007
[5] D. Rusanovskyy, K. Ugur, J. Lainema, "Adaptive Interpolation with Directional Filters", ITU-T Q.6/SGI6 VCEG, VCEG-AG21, October 2007
[6] S. Wittman, T. Wedi, Post-filter SEI message for 4:4:4 coding, MPEG/ITU Joint Video Team, JVT-S030r1, April 2006
[7] Mark Owen, Practical Signal Processing, chapter 4, Cambridge University Press, 2007

The invention claimed is:
1. A method of encoding a plurality of filter coefficients of an adaptive filter into a bitstream, the method comprising:
  entropy encoding the filter coefficients into the bitstream;
  determining a prediction for an instance of the filter coefficients based on at least one of the remaining filter coefficients;
  determining a prediction error based on the difference between the instance of the filter coefficients and the prediction; and wherein the step of entropy encoding the plurality of filter coefficients comprises entropy encoding the prediction error for the instance of the filter coefficients and entropy encoding the remaining filter coefficients;

the filter coefficients being arranged in a matrix; and wherein the step of determining a prediction for an instance of the filter coefficients further comprises:

subdividing the matrix of filter coefficients into a plurality of sub-matrices, each having a subset of filter coefficients;

for each of the sub-matrices predicting the filter coefficients in the sub-matrix using the filter coefficients not in the sub-matrix:

applying a cost function to each of the sub-matrices having the predicted filter coefficients and its associated filter coefficients not in the sub-matrix;

selecting the sub-matrix with the lowest cost as the sub-matrix to be encoded; and encoding an index of the selected sub-matrix.

2. The method of claim 1, wherein the matrix of filter coefficients is subdivided into at least two sub-matrices having coefficients from the center part of the matrix.

3. The method of claim 1, wherein the filter coefficients are arranged in a matrix of filter coefficients having at least one symmetry axis, and wherein the step of determining a prediction for an instance of the filter coefficients comprises a step of mirroring a corresponding filter coefficient around said at least one symmetry axis of said matrix.

4. The method of claim 1, wherein the filter coefficients are difference filter coefficients, and wherein the method further comprises a step of determining the difference filter coefficients by subtracting reference filter coefficients from corresponding filter coefficients.

5. The method of claim 1, wherein the step of determining a prediction for an instance of the filter coefficients comprises:

determining a sum of the remaining filter coefficients;

determining the prediction by subtracting the sum from a constant; and wherein the constant is equal to the DC-gain of the filter and the DC-gain is equal to the sum of all filter coefficients, or wherein the matrix of filter coefficients is subdivided into at least two sub-matrices having coefficients from the center part of the matrix, and the constant is equal to zero.

6. The method of claim 1, further comprising a step of quantizing the filter coefficients prior to the step of predicting a filter coefficient.

7. An encoder for receiving filter coefficients, encoding filter coefficients of an adaptive filter, and outputting a bitstream of encoded filter coeffients, the encoder comprising a processor configured to:

entropy encode the filter coefficients into the bitstream;

determine a prediction for an instance of the filter coefficients based on at least one of the remaining filter coefficients;

determine a prediction error based on the difference between the instance of the filter coefficients and the prediction; and wherein the processor is configured to entropy encode the plurality of filter coefficients by entropy encoding the prediction error for the instance of the filter coefficients and entropy encoding the remaining filter coefficients;

the filter coefficients being arranged in a matrix; and wherein the processor is configured to determine a prediction for an instance of the filter coefficients based on being further configured to:

subdivide the matrix of filter coefficients into a plurality of sub-matrices, each having a subset of filter coefficients;

for each of the sub-matrices, predict the filter coefficients in the sub-matrix using the filter coefficients not in the sub-matrix:

apply a cost function to each of the sub-matrices having the predicted filter coefficients and its associated filter coefficients not in the sub-matrix;

select the sub-matrix with the lowest cost as the sub-matrix to be encoded; and encode an index of the selected sub-matrix.

8. The encoder of claim 7, further comprising a third interface operatively connected to the processor, for receiving reference filter coefficients.

9. A method of decoding a bitstream of encoded filter coefficients of an adaptive filter into a plurality of decoded filter coefficients, the method comprising the steps of:

entropy decoding the bitstream into filter coefficients, said entropy decoding based on:

entropy decoding a prediction error corresponding to an instance of the filter coefficients;

entropy decoding remaining filter coefficients from the bitstream;

determining a prediction for the instance of the filter coefficients from at least one of the remaining filter coefficients;

restoring the instance of the filter coefficients by adding the prediction error to the prediction;

the bitstream comprising a sub-matrix index and the method further comprising:

decoding the sub-matrix index;

decoding at least one prediction error from the sub-matrix corresponding to the sub-matrix index;

decoding the plurality of filter coefficients not in the sub-matrix;

determining predictions of filter coefficients from the plurality of filter coefficients corresponding to the prediction errors; and restoring filter coefficients from the predictions of filter coefficients and the corresponding prediction errors.

10. The method of claim 9, wherein the filter coefficients are difference filter coefficients, and the method further comprises a step of establishing a filter coefficient by adding a reference filter coefficient to the corresponding difference filter coefficient.

11. The method of claim 9, wherein the step of determining a prediction for the instance of the filter coefficients from at least one of the remaining filter coefficients comprises:

determining a sum of the remaining filter coefficients;

determining the prediction by subtracting the sum from a constant; and wherein the constant is equal to the DC-gain of the filter, or wherein the filter coefficients are difference filter coefficients and the filter coefficients are established by adding reference filter coefficients to the corresponding difference filter coefficients, and wherein the constant is equal to zero.

12. The method of claim 9, wherein the filter coefficients are arranged in a matrix of filter coefficients having at least one symmetry axis, and wherein the processor is configured to determine at least one prediction of at least one filter coefficient based on predicting at least one filter coefficient by mirroring a corresponding filter coefficient around said at least one symmetry axis of said matrix.

13. The method of claim 9, wherein the processor is configured to de-quantize the filter coefficients.

14. A decoder for receiving a bitstream, decoding the bitstream into filter coefficients of an adaptive fitter, and outputting the decoded filter coefficients, the decoder comprising a processor configured to:
    entropy decode the bitstream into filter coefficients, based on being configured to:
    entropy decode a prediction error corresponding to an instance of the filter coefficients;
    entropy decode remaining filter coefficients from the bitstream;
    determine a prediction for the instance of the filter coefficients from at least one of the remaining filter coefficients;
    restore the instance of the filter coefficients by adding the prediction error to the prediction;
    the bitstream comprising a sub-matrix index, wherein the processor is further configured to:
    decode the sub-matrix index;
    decode at least one prediction error from the sub-matrix corresponding to the sub-matrix index;
    decode the plurality of filter coefficients not in the sub-matrix;
    determine predictions of filter coefficients from the plurality of filter coefficients corresponding to the prediction errors; and
    restore filter coefficients from the predictions of filter coefficients and the corresponding prediction errors.

15. The decoder of claim 14, further comprising a third interface operatively connected to the processor for receiving reference filter coefficients.

\* \* \* \* \*